Figure 1:
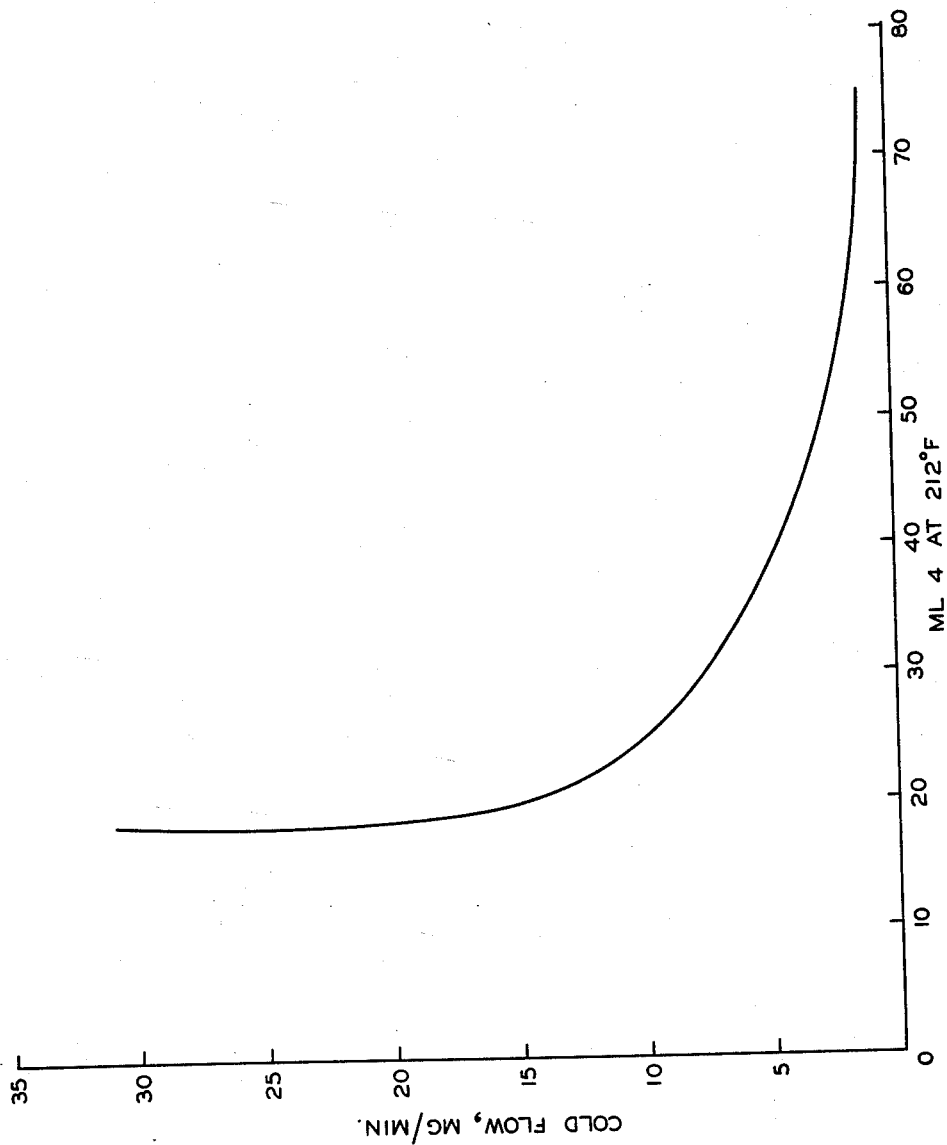

May 4, 1965  F. E. NAYLOR  3,182,052
PROCESS FOR PRODUCING CIS-1,4 POLYBUTADIENE OF REDUCED COLD-FLOW
Filed Nov. 20, 1961  2 Sheets-Sheet 1

INVENTOR.
F. E. NAYLOR
BY *Hudson and Young*
ATTORNEYS

May 4, 1965 F. E. NAYLOR 3,182,052
PROCESS FOR PRODUCING CIS-1,4 POLYBUTADIENE OF REDUCED COLD-FLOW
Filed Nov. 20, 1961 2 Sheets-Sheet 2
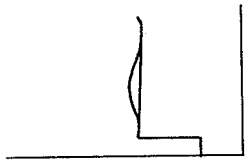
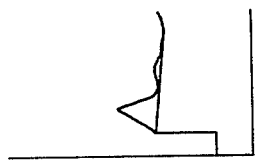
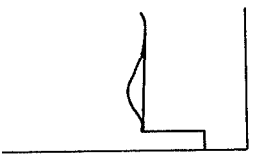
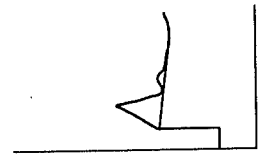
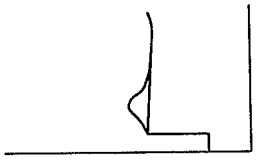
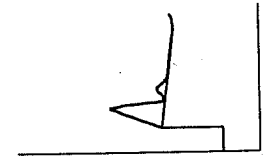
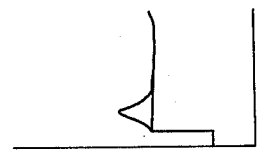
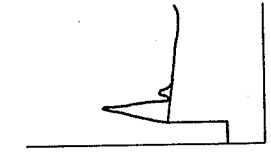
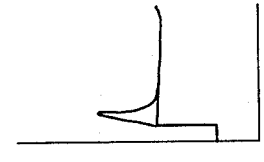
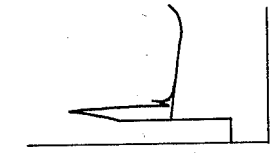
FIG. 2a   FIG. 2b
REFRACTIVE INDEX GRADIENT
DISTANCE
*INVENTOR.*
F. E. NAYLOR
BY *Hudson & Young*
*ATTORNEYS*

United States Patent Office 3,182,052
Patented May 4, 1965

3,182,052
PROCESS FOR PRODUCING CIS-1,4-POLY-BUTADIENE OF REDUCED COLD-FLOW
Floyd E. Naylor, Bartlesville, Okla., assignor to Phillips Petroleum Company, a corporation of Delaware
Filed Nov. 20, 1961, Ser. No. 153,354
5 Claims. (Cl. 260—94.3)

This invention relates to a polymerization process for the production of polymodal cis-polybutadiene.

Among the various new polymers developed from the solution polymerization of conjugated dienes using organometal initiator systems are the cis polymers of butadiene. The physical properties of these polymers are such as to make them particularly suitable for heavy duty tires and other articles for which natural rubber has heretofore been preferred.

In the manufacture and processing of these polymers and particularly in their packaging, shipping, and storage, certain difficulties have been encountered from their tendency to cold-flow in the unvulcanized state. For example, in the event of cracks or punctures in a package, polymer flows therefrom, leading to product loss or contamination, sticking together of packages, and the like.

An object of this invention is to provide a new polymerization process which produces cis-polybutadiene with reduced tendency to cold-flow.

Accompanying and forming a part of this disclosure is a drawing comprising two figures.

FIGURE 1 is a graph showing the relationship between cold-flow and Mooney viscosity (ML–4 at 212° F.) of cis polybutadiene prepared by the conventional process wherein the total initiator ingredients are added to the reaction zone prior to the occurrence of any polymerization. The curve is based upon results obtained from tests made upon a large number of polybutadienes containing approximately 95 percent cis-1,4-addition. The relationship between cold flow and viscosity is not greatly affected by changes in cis content in the range of 85 to 100 percent. From this curve, it is possible to compare the improvement obtained when operating according to the two-step process of my invention as compared to one-step polymerization. For the conventional polymer, the cold-flow is very high in the desired Mooney range. Products of the desired Mooney range having very low, or zero, cold-flow are obtained by my process.

FIGURE 2 shows a series of curves identified as FIGURE 2a and FIGURE 2b, these showing the results of studies of two polymer products by the sedimentation velocity method using an ultracentrifuge. These curves are discussed in Example V.

Broadly, my invention resides in the production of polybutadiene in the presence of an initiator comprising at least an organometal compound as a first component and a second component containing titanium and iodine, the total amount of titanium used being in the range of 0.2 to 2 gram millimols per 100 grams of 1,3-butadiene, the improvement comprising charging a first amount of said initiator in an amount to provide 0.02 to 0.15 gram millimols of titanium per 100 grams of 1,3-butadiene and polymerizing 2 to 45 percent of said 1,3-butadiene to a polymer having an inherent viscosity in the range of 6 to 20, and thereafter adding the balance of said initiator without adding additional 1,3-butadiene while said polymerization continues to substantial completion to form a final polymer product having an inherent viscosity in the range of 2 to 5. The second step can be carried out by adding all of the initiator ingredients at the beginning thereof or by adding all of the organometal compound and the component containing titanium and iodine over an extended period of time either stepwise or continuously.

These initiators have been the subject of a considerable amount of study in recent years and a large number of them are available. Those skilled in the art will recognize that these systems produce polybutadiene of a high cis content. The polymers contain cis-1,4, trans-1,4, and vinyl addition, at least 85 percent of the polymer being formed by cis-1,4 addition. Broadly, then, this invention relates to cis polybutadiene formed by 85 to 100 percent cis-1,4 addition.

My invention is based on the discovery that substantial improvements in processability and reduction in cold-flow of cis-polybutadiene can be achieved by effecting the polymerization in a single reactor in a two-step process which comprises polymerization at two different initiator levels, the first of which is adjusted to yield a high inherent viscosity polymer and the second to yield a low inherent viscosity polymer. In the first step of the process the diluent, monomer, and a part of the total initiator are charged and a minor amount of the monomer is allowed to polymerize, generally not more than 40 or 45 percent by weight. The polymer formed in this step has a high inherent viscosity because the initiator level is low. By regulating the initiator level and the conversion, the type and amount of polymer produced in this step of the process can be easily controlled.

The second step of this process involves charging additional initiator and continuing the polymerization to produce a polymer of much lower inherent viscosity than is obtained in the first step. Again the type of polymer can be easily controlled by regulating the initiator level. Polymerization is continued until the desired conversion is reached.

The superiority of the present process over conventional processes for the production of cis-polybutadiene can be readily demonstrated by comparing two polymers of substantially the same Mooney value, one prepared by the two-step procedure herein described and the other by charging all of the initiator orginally, both using the same type of initiator. The polymer prepared by the process of this invention is distinctly superior in cold-flow properties.

The new products disclosed herein are known as "bimodal" or "polymodal" cis-polybutadienes. These terms were adopted because of the plurality of "modes" or "humps" in the molecular weight distribution curve when compared to the usual products which have a comparatively narrow molecular weight range. The usual compounding recipes in preparing vulcanized products are used including softeners, fillers, and curatives. It is sometimes desirable to blend the polymodal cis-polybutadiene with SBR, natural rubber, and the like.

The following groups of initiator systems can be used in operation according to my invention. These systems include (1) an initiator comprising titanium tetraiodide and an organometal compound having the formula $R_mM$ where R is a hydrocarbon group, M is selected from the group consisting of aluminum, mercury, zinc, beryllium, cadmium, magnesium, sodium and potassium, and $m$ is equal to the valence of the metal M, said organometal compound being present in an amount of 1 to 20 mols per mol of titanium tetraiodide, (2) an initiator comprising titanium tetrachloride, titanium tetraiodide, and an organometal having the formula $R_mM'$ where R is a hydrocarbon group, M' is selected from the group consisting of aluminum, magesium, lead, sodium and potassium, and $m$ is equal to the valence of the metal M', the mol ratio of titanium tetrachloride to titanium tetraiodide being in the range of 0.05:1 to 5:1, said organometal compound being present in an amount of 1 to 20 mols per mol of titanium tetrachloride plus titanium tetraiodide, (3) an initiator comprising elemental iodine, a compound having the formula $TiX_a$, where X is selected from the group consisting of chlorine and bromine and $a$ is an integer from 2 to 4, inclusive, and an organometal compound selected from the group consisting of $R_3Al$ and $R_2Mg$ where R is a hydrocarbon group, the mol ratio of titanium halide to iodine being in the range of 10:1 to 0.25:1 and said organometal compound being present in an amount of 1 to 20 mols per mol of titanium halide, (4) an initiator comprising a titanium halide having the formula $TiX_4$ where X is selected from the group consisting of chlorine and bromine, an inorganic iodide having the formula $M''I_b$ where M'' is selected from the group consisting of beryllium, zinc, cadmium, aluminum, gallium, indium, thallium, silicon, germanium, tin, lead, phosphorus, antimony, arsenic and bismuth and $b$ is an integer from 2 to 5 inclusive and an organometal compound having the formula $R_xM'''$, where R is a hydrocarbon group, M''' is selected from the group consisting of aluminum, gallium, indium, and thallium, and $x$ is equal to the valence of the metal M''', the mol ratio of $TiX_4$ to $M''I_b$ being in the range of 0.05:1 to 5:1 and said organometal compound being present in an amount of 1 to 20 mols per mol of $TiX_4$ plus $M''I_b$, and (5) an initiator comprising titanium tetraiodide, an inorganic halide having the formula $M^{iv}X_c$ where $M^{iv}$ is selected from the group consisting of aluminum, gallium, indium, thallium, germanium, tin, lead, phosphorus, antimony, arsenic, and bismuth, X is selected from the group consisting of chlorine and bromine, $c$ is an integer from 2 to 5, inclusive, and an organometal compound having the formula $R_xM'''$ where R is a hydrocarbon group and M''' and $x$ are as defined above, the mol ratio of titanium tetraiodide to $M^{iv}X_c$ being in the range of 0.05:1 to 5:1 and said organometal compound being present in an amount of 1 to 20 mols per mol of titanium tetraiodide plus $M^{iv}X_c$, the number of carbon atoms in each R group being up to and including 20. The total amount of titanium used in the system should be in the range of 0.2 to 2 millimols per 100 grams of 1,3-butadiene. In the first step of polymerization, a small amount of initiator is added and this results in the production of a polymer having a high inherent viscosity, preferably in the range of 6 to 20. Thereafter, the balance of the initiator is added and the polymerization continues forming a final product having an inherent viscosity in the range of 2 to 5.

The following are examples of preferred catalyst systems which can be used to polymerize 1,3-butadiene to a cis 1,4-polybutadiene: triisobutylaluminum and titanium tetraiodide; triethylaluminum and titanium tetraiodide; triisobutylaluminum, titanium tetrachloride and titanium tetraiodide; triethylaluminum, titanium tetrachloride and titanium tetraiodide; diethylzinc and titanium tetraiodide; dibutylmercury and titanium tetraiodide; triisobutylaluminum, titanium tetrachloride and iodine; triethylaluminum, titanium tetrabromide and iodine; n-amylsodium and titanium tetraiodide; phenylsodium and titanium tetraiodide; n-butylpotassium and titanium tetraiodide; phenylpotassium and titanium tetraiodide; n-amylsodium, titanium tetrachloride and titanium tetraiodide; triphenylaluminum and titanium tetraiodide; triphenylaluminum, titanium tetraiodide and titanium tetrachloride; triphenylaluminum, titanium tetrachloride and iodine; tri-alpha-naphthylaluminum, titanium tetrachloride and iodine; tribenzylaluminum, titanium tetrabromide and iodine; diphenylzinc and titanium tetraiodide; di-2-tolylmercury and titanium tetraiodide; tricyclohexylaluminum, titanium tetrachloride and titanium tetraiodide; ethylcyclopentylzinc and titanium tetraiodide; tri(3-isobutylcyclohexyl) aluminum and titanium tetraiodide; tetraethyllead, titanium tetrachloride and titanium tetraiodide; dimethylphenyllead, titanium tetrachloride and titanium tetraiodide; diphenylmagnesium and titanium tetraiodide; di-n-propylmagnesium, titanium tetrachloride and titanium tetraiodide; dimethylmagnesium, titanium tetrachloride and iodine; diphenylmagnesium, titanium tetrabromide and iodine; methylethylmagnesium, and titanium tetraiodide; dibutylberyllium and titanium tetraiodide; diethylcadmium and titanium tetraiodide; diisopropylcadmium and titanium tetraiodide; triisobutylaluminum, titanium tetrachloride, and antimony triiodide; triisobutylaluminum, titanium tetrachloride and aluminum triiodide; triisobutylaluminum, titanium tetrabromide and aluminum triiodide; triethylaluminum, titanium tetrachloride, and phosphorus triiodide; tri-n-dodecylaluminum, titanium tetrachloride; and tin tetraiodide; triethylgallium, titanium tetrabromide, and aluminum triiodide; tri-n-butylaluminum, titanium tetrachloride, and antimony triiodide; tricyclopentylaluminum, titanium tetrachloride, and silicon tetraiodide; triphenylaluminum, titanium tetrachloride, and gallium triiodide; triisobutyl aluminum, titanium tetraiodide and tin tetrachloride, triisobutylaluminum, titanium tetraiodide and antimony trichloride; triisobutylaluminum, titanium tetraiodide and aluminum trichloride; trisobutylaluminum, titanium tetraiodide, and tin tetrabromide; triethylgallium, ttanium tetraiodide, and aluminum tribromide; triethylaluminum, titanium tetraiodide, and arsenic trichloride; and tribenzylaluminum, titanium tetraiodide, and germanium tetrachloride.

The polymerization process for preparing cis-polybutadiene is carried out in the presence of a hydrocarbon diluent which is not deleterious to the catalyst system. Examples of suitable diluents include aromatic, paraffinic, and cycloparaffinic hydrocarbons, it being understood that mixtures of these materials can also be used. Specific examples of hydrocarbon diluents include benzene, toluene, n-butane, isobutane, n-pentane, isooctane, n-dodecane, cyclopentane, cyclohexane, methylcyclohexane and the like. It is often preferred to employ aromatic hydrocarbons as the diluent.

The process for preparing cis-polybutadiene can be carried out at temperatures varying over a rather wide range, e.g., from $-100$ to $250°$ F. It is usually preferred to operate at a temperature in the range of $-30$ to $160°$ F. The polymerization reaction can be carried out under autogenous pressure or at any suitable pressure sufficient to maintain the reaction mixture substantially in the liquid phase. The pressure will thus depend upon the particular diluent employed and the temperature at which the polymerization is conducted. However, higher pressures can be employed if desired, these pressures being obtained by some such suitable method as the pressurization of the reactor with a gas which is inert with respect to the polymerization reaction.

Various materials are known to be detrimental to the catalyst employed in preparing the cis-polybutadiene. These materials include carbon dioxide, oxygen and water. It is usually desirable, therefore, that the butadiene and the diluent be freed of these materials as well as other materials which may tend to inactivate the catalyst. Furthermore, it is desirable to remove air and moisture from the reaction vessel in which the polymerization is to be conducted. Upon completion of the polymerization reaction, the reaction mixture is then treated to inactivate the catalyst and recover the rubbery polymer. A suitable method for accomplishing this result involves steam stripping the diluent from the polymer. In another suitable method, a catalyst inactivating material, such as an alcohol, is added to the mixture so as to inactivate the catalyst and cause precipitation of the polymer. The polymer is then separated from the alcohol and diluent by any suitable means, such as decantation or filtration. It has been found to be advantageous to add an antioxidant, such as phenyl-betanaphthylamine, 2,2'-methylene-bis(4-methyl-6-tertiary-butylphenol), etc., to the polymer solution prior to recovery of the polymer.

The initiator used in either or both steps of the process can be preformed, i.e., the components are mixed prior to being charged to the polymerization. While various procedures can be employed, one method for preparing a very efficient preformed initiator comprises contacting the ingredients, allowing the precipitate which forms to settle, removing the supernatant liquid, and adding a hydrocarbon diluent to redisperse the precipitate.

Prior to charging the initiator to the first step, a small quantity of an organometal compound, generally the same as that used in the initiator preparation, is frequently added to the monomer and diluent as a scavenger for any impurities that are present.

The various types of initiators can be employed for either step of the process and what is used in the first step can be the same or different from that in the second.

The following examples illustrate my invention:

EXAMPLE I

This example illustrates the use of a different initiator for each of the steps of the process wherein both of the initiators are formed in situ. All polymerization was carried out at 41° F. in a glass reaction zone. The high molecular weight portion of the polymer was prepared by charging triisobutyl-aluminum (TBA) followed by a dispersion of titanium tetraiodide (TTI) to the combined monomer and solvent. These reactions were allowed to proceed for times ranging from 0.7 to 2.8 hours to obtain a conversion of about 10, 15, or 20 percent at which time a portion was removed for analytical data. At this point, triisobutylaluminum, iodine, and titanium tetrachloride (TTC) were charged in that order to the reaction zone and polymerization was allowed to proceed to completion (6 to 22 hours). Thereafter, an alcoholic solution of 2,2'-methylene-bis(4-methyl-6-tertiary-butylphenol) was added in an amount to provided 2 percent by weight based upon the butadiene charged. The products were isolated by pouring the reaction mixture into alcohol, separating the solid polymer, and drying in a vacuum oven at 140° F. In each run, the TBA–iodine–TTC was used in a mol ratio of 5–1.75–1. The recipes for the first and second step are shown in the following table:

| Step 1 (high molecular weight portion): | Parts |
|---|---|
| Butadiene | 100. |
| Toluene | 1100. |
| Triisobutylaluminum (TBA) | 0.08 to 0.1 (0.4 to 0.5 mhm). |
| Titanium tetraiodide (TTI) | 0.017 (0.03 mhm). |

| Step 2 (low molecular weight portion): | |
|---|---|
| Triisobutylaluminum (TBA) | Variable. |
| Iodine (I$_2$) | Variable. |
| Titanium tetrachloride (TTC) | Variable. |

The analytical results, including the conversion obtained, were as follows:

TRIISOBUTYLALUMINUM FOR STEP 2, 2 mhm[1]

| Run No. | Step 1 | | Final | | | Cold flow |
|---|---|---|---|---|---|---|
| | Conv., percent | Inherent viscosity | Conv., percent | Inherent viscosity | Mooney viscosity ML–4 at 212° F. | |
| 1 | 6 | 9.8 | 100 | 2.74 | 32 | 2.3 |
| 2 | 6 | 11.5 | 100 | 2.83 | 35 | 2.2 |
| 3 | 8 | 10.7 | 88 | 2.83 | 32 | 1.4 |
| 4 | 14 | 10.5 | 94 | 3.26 | 39 | 3.6 |
| 5 | 15 | 11.1 | 94 | 3.40 | 33 | 1.3 |
| 6 | 19 | 12.2 | 99 | 3.94 | 46 | 0.0 |
| 7 | 19 | 12.7 | 100 | 4.01 | 45 | 0.0 |

TRIISOBUTYLALUMINUM FOR STEP 2, 2.5 mhm

| 8 | 6 | 10.6 | 100 | 2.36 | 18 | 5.8 |
| 9 | 10 | 10.8 | 100 | 2.72 | 25 | 1.6 |
| 10 | 11 | 10.6 | 100 | 2.81 | 26 | 1.1 |
| 11 | 11 | 11.1 | 100 | 2.74 | 30 | 1.1 |
| 12 | 13 | 10.6 | 91 | 2.62 | 26 | 2.6 |
| 13 | 15 | 10.6 | 92 | 3.03 | 24 | 1.8 |
| 14 | 15 | 10.8 | 92 | 2.85 | 27 | 1.7 |
| 15 | 19 | 12.3 | 100 | 3.60 | 30 | 0.0 |
| 16 | 20 | 12.3 | 100 | 3.81 | 32 | 0.0 |

TRIISOBUTYLALUMINUM FOR STEP 2, 3 mhm

| 17 | 8 | 8.9 | 100 | 2.22 | 15 | 7.6 |
| 18 | 11 | 10.7 | 100 | 2.67 | 18 | 2.3 |
| 19 | 12 | 11.8 | 100 | 2.80 | 19 | 1.7 |
| 20 | 13 | 10.5 | 94 | 2.65 | 16 | 3.2 |
| 21 | 14 | 10.9 | 95 | 2.72 | 16 | 2.6 |
| 22 | 14 | 10.8 | 94 | 2.75 | 17 | 3.0 |
| 23 | 15 | 12.4 | 100 | 2.79 | 24 | 0.8 |
| 24 | 18 | 12.2 | 99 | 3.48 | 27 | 0.2 |
| 25 | 21 | 10.8 | 100 | 3.17 | 29 | 0.0 |

[1] Gram millimols per 100 grams 1,3-butadiene originally charged.

The above data show that cold flow can be substantially eliminated by operating according to this process. Comparison of the Mooney viscosity and cold flow for any run with FIGURE 1 shows lower cold flow for that particular Mooney viscosity.

EXAMPLE II

The data in this example illustrate operation using a preformed initiator for the first step of the polymerization. Reduced cold flow for a given Mooney viscosity is obtained.

The polymerization was conducted at 41° F. in the same reaction vessel used in Example I and polymerization was initiated using a mixture of triisobutylaluminum and titanium triiodide which was aged 15 to 30 minutes at ambient temperature. At intervals of 30, 60, 90, or 120 minutes, portions of the Step 1 polymer solution were withdrawn and Step 2 was initiated by adding triisobuylaluminum, iodine, and titanium tetrachloride, the time for Step 2 being 16 to 18 hours. The products were recovered in the same manner as Example I.

The recipe is shown in the following table:

| | Parts |
|---|---|
| Butadiene | 100 |
| Toluene | 1100 |
| Scavenger, triisobutylaluminum (TBA) | 0.42 (0.75 mhm) |
| Step 1, preformed initiator: | |
|   Triisobutylaluminum (TBA) | Variable |
|   Titanium tetraiodide (TTI) | Variable |
|   TBA–TTI, mol ratio | 2–1 |
| Step 2, in situ prepared initiator | |
|   Triisobutylaluminum (TBA) | Variable |
|   Iodine ($I_2$) | Variable |
|   Titanium tetrachloride (TTC) | Variable |
|   TBA–$I_2$–TTC, mol ratio | 5–1.75–1 |

The data on the products obtained are shown in the following table:

POLYMER DATA

*Initiator, mhm Step 1—(TBA 0.08 TTI 0.04)*

Step 2—TBA 2.0 $I_2$ 0.70 TTC 0.4

| Run No. | Step 1 conversion Time, min. | Step 1 conversion Percent | Final conversion, percent | Percent high viscosity | Inherent viscosity High | Inherent viscosity Final | Mooney viscosity, ML–4 at 212° F. | Cold flow, mg./min. |
|---|---|---|---|---|---|---|---|---|
| 1 | 63 | 5 | 90 | 6 | 8.6 | 2.50 | 34 | 2.6 |
| 2 | 89 | 14 | 86 | 16 | 9.2 | 3.13 | 32 | 0.9 |
| 3 | 116 | 19 | 93 | 20 | 11.2 | 3.63 | 49 | 0.3 |

STEP 2—TBA 2.5 $I_2$ 0.88 TTC 0.5

| Run No. | Time, min. | Percent | Final conv., percent | Percent high viscosity | High | Final | Mooney | Cold flow |
|---|---|---|---|---|---|---|---|---|
| 4 | 65 | 4 | 89 | 4 | 9.3 | 1.83 | 18 | 11.2 |
| 5 | 89 | 8 | 94 | 8 | 9.2 | 2.51 | 28 | 3.0 |
| 6 | 118 | 14 | 93 | 15 | 11.4 | 2.84 | 26 | 1.7 |

STEP 2—TBA 3.0 $I_2$ 1.05 TTC 0.6

| Run No. | Time, min. | Percent | Final conv., percent | Percent high viscosity | High | Final | Mooney | Cold flow |
|---|---|---|---|---|---|---|---|---|
| 7 | 64 | 5 | 89 | 6 | 8.6 | 1.87 | 14 | 15.0 |
| 8 | 89 | 11 | 94 | 12 | 12.2 | 2.75 | 22 | 1.9 |
| 9 | 121 | 18 | 92 | 20 | 12.4 | 3.18 | 27 | 0.2 |

POLYMER DATA

*Initiator, mhm Step 1—(TBA 0.16 TTI 0.08)*

STEP 2—TBA 1.5 $I_2$ 0.52 TTC 0.3

| Run No. | Time, min. | Percent | Final conv., percent | Percent high viscosity | High | Final | Mooney | Cold flow |
|---|---|---|---|---|---|---|---|---|
| 1 | 28 | 8 | 92 | 9 | 7.6 | 2.40 | 50 | 2.8 |
| 2 | 57 | 19 | 92 | 21 | 8.6 | 3.09 | 56 | 1.0 |
| 3 | 89 | 25 | 92 | 27 | 8.2 | 3.81 | 54 | 0 |
| 4 | 121 | 36 | 94 | 38 | 8.6 | 4.28 | 61 | 0 |

STEP 2—TBA 2.0 $I_2$ 0.70 TTC 0.4

| Run No. | Time, min. | Percent | Final conv., percent | Percent high viscosity | High | Final | Mooney | Cold flow |
|---|---|---|---|---|---|---|---|---|
| 5 | 28 | 8 | 94 | 8 | 8.7 | 2.53 | 30 | 2.3 |
| 6 | 57 | 17 | 88 | 19 | 7.8 | 2.91 | 30 | 2.3 |
| 7 | 91 | 31 | 97 | 32 | 8.5 | 3.79 | 46 | 0 |
| 8 | 122 | 43 | 97 | 44 | 8.7 | 4.09 | 60 | 0 |

STEP 2—TBA 2.5 $I_2$ 0.88 TTC 0.5

| Run No. | Time, min. | Percent | Final conv., percent | Percent high viscosity | High | Final | Mooney | Cold flow |
|---|---|---|---|---|---|---|---|---|
| 9 | 29 | 8 | 94 | 8 | 7.8 | 2.40 | 20 | 5.9 |
| 10 | 58 | 21 | 96 | 22 | 7.9 | 3.05 | 28 | 1.2 |
| 11 | 92 | 34 | 96 | 35 | 8.6 | 3.90 | 42 | 0 |
| 12 | 124 | 39 | 97 | 40 | 8.9 | 4.29 | 40 | 0 |

STEP 2—TBA 3.0 $I_2$ 1.05 TTC 0.6

| Run No. | Time, min. | Percent | Final conv., percent | Percent high viscosity | High | Final | Mooney | Cold flow |
|---|---|---|---|---|---|---|---|---|
| 13 | 29 | 9 | 96 | 9 | 7.8 | 2.30 | 15 | 7.5 |
| 14 | 59 | 21 | 94 | 22 | 7.7 | 2.80 | 21 | 1.9 |
| 15 | 92 | 27 | 94 | 29 | 7.9 | 2.98 | 26 | 0.7 |
| 16 | 125 | 40 | 81 | 50 | 8.7 | 4.32 | 38 | 0.4 |

POLYMER DATA

*Initiator, mhm Step 1—(TBA 0.24 TTI 0.12)*

STEP 2—TBA 1.5 I₂ 0.52 TTC 0.3

| Run No. | Step 1 conversion | | Final conversion, percent | Percent high viscosity | Inherent viscosity | | Mooney viscosity, ML-4 at 212° F. | Cold flow, mg./min. |
|---|---|---|---|---|---|---|---|---|
| | Time, min. | Percent | | | High | Final | | |
| 1 | 31 | 17 | 96 | 18 | 7.2 | 3.03 | 47 | 1.0 |
| 2 | 60 | 38 | 99 | 38 | 9.0 | 4.44 | 76 | |

STEP 2—TBA 2.0 I₂ 0.70 TTC 0.4

| 3 | 30 | 7 | 98 | 7 | 8.7 | 2.66 | 36 | 0.9 |
| 4 | 60 | 36 | 98 | 37 | 7.2 | 3.81 | 50 | |

STEP 2—TBA 2.5 I₂ 0.88 TTC 0.5

| 5 | 30 | 14 | 89 | 16 | 6.5 | 2.53 | 18 | 3.5 |
| 6 | 60 | 31 | 96 | 32 | 6.8 | 3.22 | 32 | 0.6 |

STEP 2—TBA 3.0 I₂ 1.05 TTC 0.6

| 7 | 30 | 14 | 97 | 14 | 7.3 | 2.25 | 19 | 2.1 |
| 8 | 59 | 37 | 97 | 38 | 7.1 | 3.85 | 41 | |

EXAMPLE III

A series of runs was made using a procedure similar to that set forth above using still a different initiator for the first step of the process. The recipe is shown in the following table:

Step 1 (high molecular weight portion):  Parts
- Butadiene _____ 100.
- Toluene _____ 1100.
- Triisobutylaluminum (TBA) ___ 0.0794–0.119 (0.40–0.60 mhm).
- Titanium tetrachloride (TTC) __ 0.00285 (0.015 mhm).
- Titanium tetraiodide (TTI) ____ 0.00834 (0.015 mhm).
- Time, minutes _____ 22–105.

Step 2 (low molecular weight portion):
- Triisobutylaluminum (TBA) __ 3 mhm.
- Iodine (I₂) _____ 1.05 mhm.
- Titanium tetrachloride (TTC) __ 0.6 mhm.
- Time, hours _____ 16–20.

Results of these runs are shown in the following table:

| Run No. | Step 1 | | Final polymer | | | |
|---|---|---|---|---|---|---|
| | Conversion, percent | Inherent viscosity | Conversion, percent | Inherent viscosity | Mooney ML-4 | Cold flow |
| 1 | 6 | 8.8 | 98 | 2.20 | 18 | 5.5 |
| 2 | 6 | 9.3 | 99 | 2.22 | 20 | 5.3 |
| 3 | 6 | 8.0 | 98 | 2.24 | 26 | 5.4 |
| 4 | 7 | 9.0 | 100 | 2.37 | 20 | 5.0 |
| 5 | 8 | 9.1 | 98 | 2.46 | 33 | 2.7 |
| 6 | 8 | 8.5 | 100 | 2.35 | 26 | 3.8 |
| 7 | 12 | 9.5 | 99 | 2.60 | 28 | 2.1 |
| 8 | 15 | 7.7 | 99 | 2.93 | 23 | 1.7 |
| 9 | 16 | 8.5 | 100 | 3.07 | 38 | 0.8 |
| 10 | 17 | 10.8 | 99 | 3.38 | 30 | 0.0 |
| 11 | 20 | 10.6 | 100 | 3.37 | 29 | 0.4 |

EXAMPLE IV

This example illustrates operation using the same initiator in each of the steps. Using essentially the polymerization and recovery procedure of the above example polymerization was conducted using the following recipe:

Parts
- Toluene _____ 1100
- Butadiene _____ 100

Step 1 (high molecular weight):  Parts
- Triisobutylaluminum _____mhm__ 0.4–6
- Iodine _____mhm__ 0.053
- Titanium tetrachloride _____mhm__ 0.03
- Time, minutes _____ 30–60
- Temperature, °F. _____ 41

Step 2 (low molecular weight)
- Triisobutylaluminum _____ 2.0
- Iodine _____ 0.7
- Titanium tetrachloride _____ 0.4
- Time, hours _____ 5 or 18
- Temperature, °F. _____ 41

Results are shown in the following table:

| Run No. | Step 1 (high mol wt.) | | Final polymer | | |
|---|---|---|---|---|---|
| | Conversion percent | Inherent viscosity | Inherent viscosity | Mooney ML-4 | Cold flow |
| 1 | 18 | 9.4 | 3.30 | 47 | 0.7 |
| 2 | 20 | 8.5 | 3.93 | 62 | 0.7 |
| 3 | 24 | 10.4 | 3.90 | 30 | 0.4 |
| 4 | 24 | 11.3 | 4.88 | 43 | 0.0 |
| 5 | 27 | 9.1 | 3.66 | 31 | 0.3 |
| 6 | 28 | 10.0 | 4.15 | 37 | 0.4 |

EXAMPLE V

This example, with FIGURE 2, is presented to show the presence of the two types of polymer in the products of my invention and to show their presence can be definitely determined. For this work two polymer products were used.

The first product was prepared at 5° C. by the conventional one-step process in which all of the initiator ingredients were added prior to polymerization. The recipe was

| | Parts by weight |
|---|---|
| 1,3-butadiene | 100 |
| Toluene | 1200 |
| Triisobutylaluminum (TBA) | 0.396 (2.0 mmoles) |
| Titanium tetraiodide (TTI) | 0.139 (0.250 mmole) |
| Titanium tetrachloride (TTC) | 0.048 (0.250 mmole) |
| TBA/TTI/TTC mole ratio | 8/1/1 |

Toluene was first charged followed by the butadiene. The mixture was cooled to 5° C. and polymerization was initiated by adding the triisobutylaluminum in toluene followed by a mixture of titanium tetraiodide and titanium tetrachloride in toluene. After 6 hours the conversion was 94 percent and a product having an inherent viscosity of 2.71 was obtained.

The second product was a bimodal polymer prepared by the two-step method of my invention. The recipe for the first step was as follows:

| | |
|---|---|
| Toluene, grams | 1100 |
| 1,3-butadiene, grams | 100 |
| TBA, mmole | 0.5 |
| TTI, mmole | 0.03 |

Toluene was charged first, the reactor was purged with nitrogen, butadiene was added, and then the TBA. The mixture was cooled to 5° C., TTI was introduced, and polymerization was effected at 5° C. for one hour 17 minutes at which time conversion had reached 20.6%. The polymer was gel free and had an inherent viscosity of 10.79.

To the above reaction mixture 3 mmoles TBA, 1.05 mmoles I$_2$, and 0.6 mmole TTC were added. Polymerization was allowed to proceed to a total reaction time of 22 hours (time includes first step). Conversion was quantitative. The polymer was gel free and had an inherent viscosity of 3.65. The Mooney value (ML–4 at 212° F.) was 29.2.

Solutions of each of these products were analyzed by the sedimentation velocity method using an ultracentrifuge. This method is described in "Ultracentrifugation, Diffusion, and Viscometry" by H. K. Schachman, copyright 1957 by Academic Press Inc., the material being reprinted from Volume IV of "Methods in Enzymology." Pages 33, 34, 37, 38, 52–58 are most pertinent. The Spinco Model E centrifuge described on page 37 was used. The work was carried out at 25° C. and 42,040 r.p.m. using 12 mm. cells. A phase plate was used as the schlieren diaphragm and Kodak Metallographic plates with a green filter in the optical system. As pointed out on page 52 of the reference, this method indicates whether one or more molecular species is present in a solution, provided these different molecules show variations in molecular size and shape.

In each case the determination was made using a solution of the product in normal hexane. Prints were made at intervals of 480 seconds and, from these prints, the distance to the peak or peaks measured and the sedimentation coefficients determined. Drawings made from these prints are shown in FIGURE 2.

FIGURE 2a was obtained using a solution containing 0.3 gram of the first rubber product of this example in normal hexane (100 ml.). From the symmetrical nature of the curve it is apparent that there is substantially only one molecular species present. The data are shown in the following table, x being the distance in centimeters from the axis of rotation.

TABLE I

| Run No. | Time, seconds | x, cm |
|---|---|---|
| 1 | 480 | 6.061 |
| 2 | 960 | 6.146 |
| 3 | 1,440 | 6.230 |
| 4 | 1,920 | 6.320 |
| 5 | 2,400 | 6.417 |

Sedimentation coefficient: 14.98.

FIGURE 2b was obtained using a solution containing 0.3425 gram in 100 ml. of normal hexane of the second rubber product of this example, the bimodal polymer prepared by two-step polymerization. Two different polymer species are present and this is indicated by two distinct humps in the curve. The data are shown in the following table:

TABLE II

| Run No. | Time, seconds | x (slow moving peak) | x (fast moving peak) |
|---|---|---|---|
| 1 | 480 | 6.088 | 6.151 |
| 2 | 960 | 6.125 | 6.260 |
| 3 | 1,440 | 6.172 | 6.370 |
| 4 | 1,920 | 6.214 | 6.476 |
| 5 | 2,400 | 6.254 | 6.579 |

Sedimentation coefficients:
Fast (high inherent viscosity polymer), 18.71.
Slow (low inherent viscosity polymer), 6,795.

For the inherent viscosity determination, one tenth gram of polymer was placed in a wire cage made from 80 mesh screen and the cage was placed in 100 ml. of toluene contained in a wide-mouth, 4-ounce bottle. After the polymer remained in contact with the solvent for 24 hours at room temperature (approximately 25° C.), the cage was removed and the solution filtered to remove any solid particles present. The resulting solution was run through a Medalia-type viscometer supported in a 25° C. temperature bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample.

To determine the amount of the addition of the various types, the polymers can be dissolved in carbon disulfide to form a solution having 25 grams of polymer per liter of solution. The infrared spectrum of such a solution (percent transmission) is then determined in a commercial infrared spectrometer.

The percent of the total unsaturation present as trans 1,4- is calculated according to the following equation and consistent units:

$$\epsilon = \frac{E}{tc}$$

where: $\epsilon$=extinction coefficient (liters-mols$^{-1}$-centimeters$^{-1}$); $E$=extinction (log $I_0/I$); $t$=path length (centimeters); and $c$=concentration (mols double bond/liter). The extinction is determined at the 10.35 micron band and the extinction coefficient used is 146 (liters-mols$^{-1}$-centimeters$^{-1}$).

The percent of the total unsaturation present as 1,2- (or vinyl) is calculated according to the above equation, using the 11.0 micron band and an extinction coefficient of 209 (liters-mols$^{-1}$-centimeters$^{-1}$).

The percent of the total unsaturation present as cis 1,4- is obtained by subtracting the trans 1,4- and 1,2- (vinyl) determined according to the above methods from the theoretical unsaturation assuming one double bond per each C$_4$ unit in the polymer.

As many possible embodiments can be made of this invention without departing from the scope thereof, it is to be understood that all matter herein set forth is to be interpreted as illustrative and not as unduly limiting the invention.

I claim:

1. In the production of polybutadiene containing at least about 85 percent cis-1,4-addition in the presence of an initiator obtained by mixing at least an organometal compound as a first component and a second component containing titanium and iodine, the total amount of titanium used being in the range of 0.2 to 2 gram millimole per 100 grams of 1,3-butadiene, the improvement comprising charging a first amount of said initiator in an amount to provide 0.02 to 0.15 gram millimols of titanium per 100 grams of 1,3-butadiene and polymerizing 2 to 45 percent of said 1,3-butadiene to a polymer having an inherent viscosity in the range of 6 to 20, and thereafter adding the balance of said initiator without adding additional 1,3-butadiene while said polymerization continues to form a final polymer product having an inherent viscosity in the range of 2 to 5 and recovering a polymer product which contains high and low inherent viscosity fractions.

2. A two step polymerization process for the production of polymodal cis-polybutadiene containing at least about 85 percent cis-1,4-addition in the presence of an initiator system selected from the group consisting of (1) an initiator obtained by mixing titanium tetraiodide and an organometal compound having the formula $R_mM$ where R is a hydrocarbon group, M is selected from the group consisting of aluminum, mercury, zinc, beryllium, cadmium, magnesium, sodium, and potassium, and $m$ is equal to the valence of the metal M, said organometal compound being present in an amount of 1 to 20 mols per mol of titanium tetraiodide, (2) an initiator obtained by mixing titanium tetrachloride, titanium tetraiodide, and an organometal having the formula $R_mM'$ where R is a hydrocarbon group M' is selected from the group consisting of aluminum, magnesium, lead, sodium, and potassium, and $m$ is equal to the valence of the metal M', the mol ratio of titanium tetrachloride to titanium tetraiodide being in the range of 0.05:1 to 5:1, said organometal compound being present in an amount of 1 to 20 mols per mol of titanium tetrachloride plus titanium tetraiodide, (3) an initiator obtained by mixing elemental iodine, a compound having the formula $TiX_a$, where X is selected from the group consisting of chlorine and bromine and $a$ is an integer from 2 to 4, inclusive, and an organometal compound selected from the group consisting of $R_3Al$ and $R_2Mg$ where R is a hydrocarbon group, the mol ratio of titanium halide to iodine being in the range of 10:1 to 0.25:1 and said organometal compound being present in an amount of 1 to 20 mols per mol of titanium halide, (4) an initiator obtained by mixing a titanium halide having the formula $TiX_4$ where X is selected from the group consisting of chlorine and bromine, an inorganic iodide having the formula $M''I_b$ where M'' is selected from the group consisting of beryllium, zinc, cadmium, aluminum, gallium, indium, thallium, silicon, germanium, tin, lead, phosphorous, antimony, arsenic, and bismuth and $b$ is an integer from 2 to 5 inclusive, and an organometal compound having the formula $R_xM'''$ where R is a hydrocarbon group M''' is selected from the group consisting of aluminum, gallium, indium, and thallium, and $x$ is equal to the valence of the metal M''', the mol ratio of $TiX_4$ to $M''I_b$ being in the range of 0.05:1 to 5:1 and said organometal compound being present in an amount of 1 to 20 mols per mol of $TiX_4$ plus $M''I_b$, and (5) an initiator obtained by mixing titanium tetraiodide, an inorganic halide having the formula $M^{iv}X_c$ where $M^{iv}$ is selected from the group consisting of aluminum, gallium, indium, thallium, germanium, tin, lead, phosphorous, antimony, arsenic, and bismuth, X is selected from the group consisting of chlorine and bromine, $c$ is an integer from 2 to 5, inclusive, and an organometal compound having the formula $R_xM'''$ where R is a hydrocarbon group, and M''' and $x$ are as defined above, the mol ratio of titanium tetraiodide to $M^{iv}X_c$ being in the range of 0.05:1 to 5:1 and said organometal compound being present in an amount of 1 to 20 mols per mol of titanium tetraiodide plus $M^{iv}X_c$, the number of carbon atoms in each R group being up to and including 20, the total amount of titanium used being in the range of 0.2 to 2 gram millimols per 100 grams of 1,3-butadiene, comprising charging a first amount of said initiator in an amount to provide 0.02 to 0.15 gram millimols of titanium per 100 grams of 1,3-butadiene and polymerizing 2 to 45 percent of said 1,3-butadiene to a polymer having an inherent viscosity in the range of 6 to 20, and thereafter adding the balance of said initiator without adding additional 1,3-butadiene while said polymerization continues to produce a final polymer product having an inherent viscosity in the range of 2 to 5 and recovering a polymer product which contains high and low inherent viscosity fractions.

3. A two-step polymerization process for the production of polybutadiene containing at least about 85 percent cis-1,4-addition comprising conducting a first polymerization step in the presence of a triisobutylaluminum-titanium tetraiodide initiator, said triisobutylaluminum being present in an amount of 1 to 20 mols per mol of titanium tetraiodide, and the second step in the presence of a triisobutylaluminum-iodine-titanium tetrachloride initiator, said triisobutylaluminum being present in an amount of 1 to 20 mols per mol of titanium tetrachloride and the mol ratio of titanium tetrachloride to iodine being in the range of 10:1 to 0.25:1, the total amount of titanium in said first and second steps being 0.2 to 2 gram millimols per 100 grams of 1,3-butadiene and the amount of said titanium used in said first step being in the range of 0.02 to 0.15 gram millimols per 100 grams of said 1,3-butadiene, the amount of 1,3-butadiene polymerized in said first step being 2 to 45 percent of the total 1,3-butadiene polymerized and recovering polymer product which contains high and low inherent viscosity fractions.

4. A two-step polymerization process for the production of polybutadiene containing at least about 85 percent cis-1,4-addition comprising a first polymerization step in the presence of a triisobutylaluminum-titanium tetrachloride-titanium tetraiodide initiator, the mol ratio of titanium tetrachloride to titanium tetraiodide being in the range of 0.05:1 to 5:1, said triisobutylaluminum being present in an amount of 1 to 20 mols per mol of titanium tetrachloride plus titanium tetraiodide and the second step in the presence of a triisobutylaluminum-iodine-titanium tetrachloride initiator, said triisobutylaluminum being present in an amount of 1 to 20 mols per mol of titanium tetrachloride and the mol ratio of titanium tetrachloride to iodine being in the range of 10:1 to 0.25:1, the total amount of titanium in said first and second steps being 0.2 to 2 gram millimols per 100 grams of 1,3-butadiene and the amount of said titanium used in said first step being in the range of 0.02 to 0.15 gram millimols per 100 grams of said 1,3-butadiene, the amount of 1,3-butadiene polymerized in said first step being 2 to 45 percent of the total 1,3-butadiene polymerized and recovering a polymer product which contains high and low inherent viscosity fractions.

5. A two-step polymerization process for the production of polybutadiene containing at least about 85 percent cis-1,4-addition in the presence of a triisobutylaluminum-iodine-titanium tetrachloride initiator system, the mol ratio of titanium tetrachloride to iodine being in the range of 10:1 to 0.25:1 and said triisobutylaluminum being present in an amount of 1 to 20 mols per mol of titanium tetrachloride, the total amount of titanium used being in the range of 0.2 to 2 gram millimols per 100 grams of 1,3-butadiene, comprising charging a first amount of said initiator in an amount to provide 0.02 to 0.15 gram millimols of titanium per 100 grams of 1,3-butadiene and permitting 2 to 45 percent of said 1,3-butadiene to polymerize to a polymer having an inherent viscosity in the range of 6 to 20, thereafter adding the balance of said initiator without adding additional 1,3-butadiene while said polymerization continues to produce a final polymer having an inherent viscosity in the range of 2 to 5 and recovering a polymer product which contains high and low inherent viscosity fractions.

(References on following page)

References Cited by the Examiner

UNITED STATES PATENTS

| | | | |
|---|---|---|---|
| 2,877,200 | 3/59 | Carpenter | 260—94.2 |
| 2,904,542 | 9/59 | Fasce et al. | 260—94.9 |
| 3,036,056 | 5/62 | Rion | 260—94.3 |
| 3,051,690 | 8/62 | Vandenberg | 260—94.3 |
| 3,076,795 | 2/63 | Hall | 260—94.7 |

OTHER REFERENCES

Linear and Stereoregular Addition Polymers, N. G. Gaylord, Interscience Publishers, Inc. (1959), pages 109, 112–113.

JOSEPH L. SCHOFER, *Primary Examiner.*